Aug. 21, 1956  W. F. ERRIG ET AL  2,759,539
CIRCUMFERENTIAL TIRE TREAD SLITTING APPARATUS
Filed Aug. 21, 1952
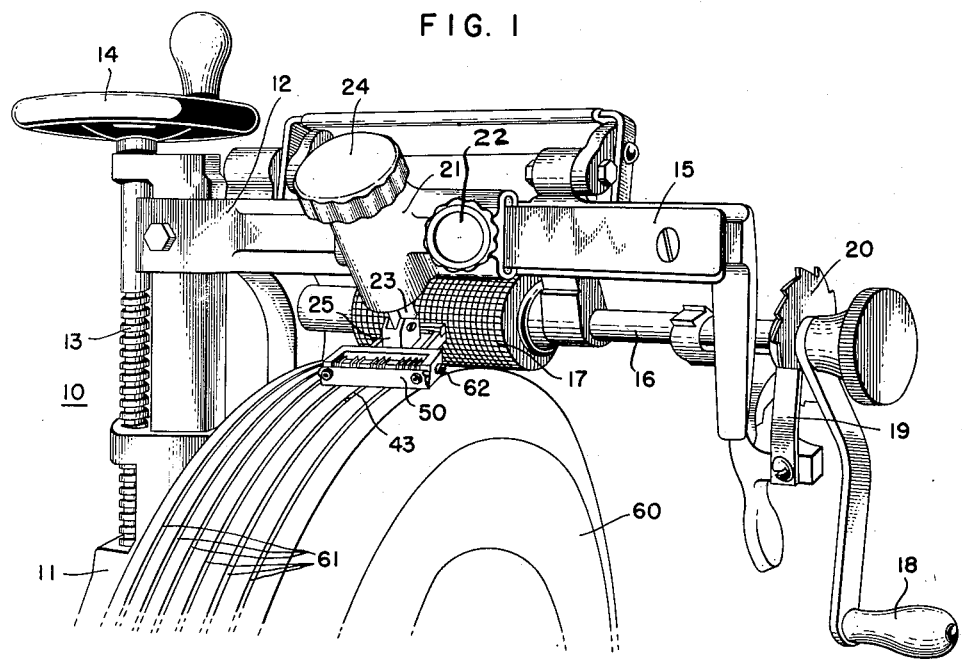
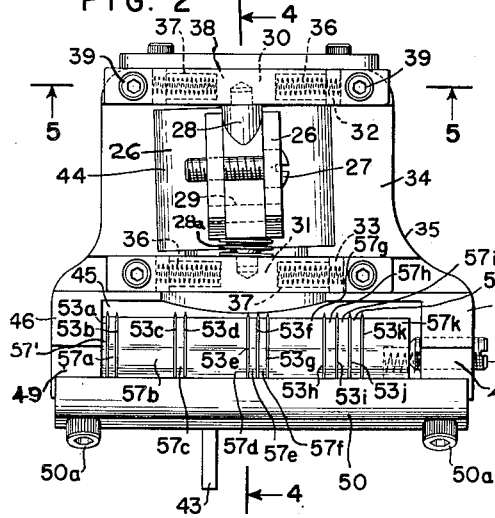
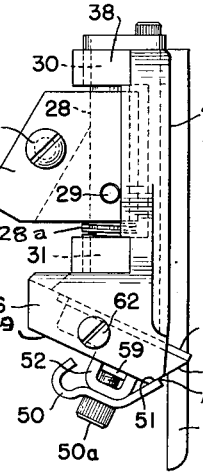
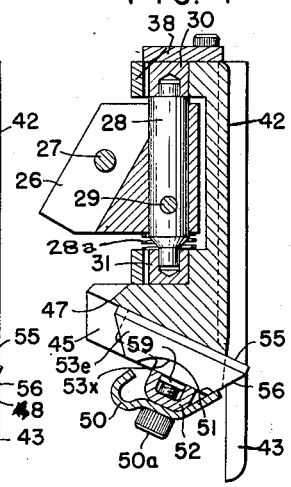
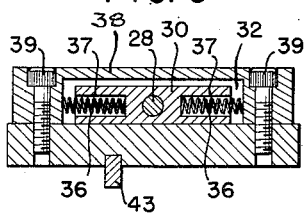
*INVENTORS.*
WILLIAM F. ERRIG
EDWARD S. DE HART
BY
ATTORNEY.

United States Patent Office 2,759,539
Patented Aug. 21, 1956

2,759,539

CIRCUMFERENTIAL TIRE TREAD SLITTING APPARATUS

William F. Errig, Jenkintown, Pa., and Edward S. DeHart, Collingswood, N. J., assignors to Food Machinery and Chemical Corporation, San Jose, Calif., a corporation of Delaware Application August 21, 1952, Serial No. 305,566

9 Claims. (Cl. 164—10.2)

This invention relates to apparatus for circumferentially slitting the treads or road engaging surfaces of vehicle tires.

The use of circumferential slits in the tread or road engaging surface of a tire has been found to be advantageous in preventing side slipping on the roadway, particularly when the roadway is wet.

Various provisions have heretofore been made for applying the circumferential slits but usually the cutting has been relatively slow. In some instances also, the circumferential grooving also found in many tires does not follow a true circumferential path, so that upon applying circumferential slits the action is not uniform for different portions of the road engaging surface and the appearance of the tread, after slitting, leaves much to be desired. The prior provisions also had other defects.

It is the principal object of the present invention to provide improved apparatus for circumferentially slitting the road engaging surface of a tire, with which a plurality of slits may be cut simultaneously.

It is a further object of the present invention to provide apparatus for circumferentially slitting the road engaging surface of a tire having an improved character of mounting and guiding of the slitting cutters.

It is a further object of the present invention to provide apparatus of the character aforesaid having a plurality of cutters, mounted at predetermined locations, so that with one setting of the blades and upon one rotation of the tire, half of the tire tread can be slitted, and upon reversal of the tire in the machine, and a second rotation, the other half of the tire tread can be slitted.

It is a further object of the present invention to provide apparatus, of the character aforesaid, having a guide bar for guiding the cutters during the slitting.

It is a further object of the present invention to provide apparatus of the character aforesaid having an improved mounting for permitting the cutters to be guided and to follow a preformed groove in the tire.

Other objects and advantageous features of the invention will be apparent from the specification and claims.

The nature and characteristic features of the invention will be more readily understood from the following description, taken in connection with the accompanying drawings forming part hereof, in which:

Figure 1 is a view in perspective of a tire incising or deskidding machine having the cutter head of the present invention mounted thereon in cutting position;

Fig. 2 is an exterior view of the cutter head and mounting therefor as seen from the face opposite the cutting face;

Fig. 3 is an exterior view of the cutter head as seen from the side;

Fig. 4 is a sectional view taken approximately on the line 4—4 of Fig. 2; and

Fig. 5 is a sectional view illustrating certain details of the cutter mounting, and taken approximately on the line 5—5 of Fig. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to Fig. 1, a deskidding machine is shown in part at 10, having a tire supporting frame 11, with tire supporting and guiding rollers (not shown), and provided with a head 12 vertically movable with respect to the frame 11 by rotation of a screw 13 having an operating hand wheel 14.

The head 12 includes a tool mounting bar 15 and has mounted thereon a shaft 16. A tire advancing roller 17 is mounted on the shaft 16 for impelling engagement with the tire supported in the frame 11. A handle 18, on the shaft 16, permits of manual rotation of the shaft 16. A ratchet pawl 19, in engagement with a ratchet wheel 20 secured to the shaft 16, limits the direction of rotation to that required for the cutting operation to be performed.

The tool mounting bar 15 has a horizontally adjustable tool post 21 mounted thereon, which is provided with a locking screw 22 and mounting post 23. The position of the mounting post 23 is adjustable by a manually operable head 24 and has, mounted thereon, a tool holder bracket 25.

The tool holder bracket 25 has spaced side wall portions 26, and a screw 27, extending through the side wall portions 26, holds the bracket 25 on the post 23. The bracket 25 has a pivot pin 28 mounted therein and secured in position by a locking pin 29.

The pivot pin 28 is journaled at its ends in guide blocks 30 and 31 in spaces 32 and 33 on the body portion 34 of a tool holder or cutter block 35. Holders 38 are provided, bounding the spaces 32 and 33, and are held in position by studs 39. Springs 36, in compression and engaging the inner ends of the holders 38 and received in bores 37 in the guide blocks 30 and 31 permit of a limited sidewise movement of the blocks 30 and 31. A spring 28a is provided to permit of accommodation required by the shifting and to reduce any tendency to undesired shifting.

The body portion 34 has a flat contact face 42 bounding one side thereof, and has secured thereto, and offset to one side of the center thereof a guide bar 43 which extends beyond the face 42. Oppositely disposed with respect to the face 42, and at one end of the body portion 34, a recess 44 is provided within which the bracket 25 is located.

The body portion 34 is provided, at the end opposite the recess 44, with a cutter blade receiving or tool receiving recess 45, which is bounded at the sides by cheeks 46.

The recess 45 has a flat inclined face 47 disposed at a predetermined angle with respect to the contact face 42. While this angle may be varied, an angle of 65° has been found to be satisfactory.

The cheeks 46 have end faces 48 and also have faces 49 parallel to the face 47.

An end cap 50 is provided having a wall portion 51 adapted to bear at its ends on the end faces 48 and enclose a holding bar 52, U-shaped or arcuate in cross section. Fasteners 50a are provided, extending through the ends of the end cap 50 and the holding bar 52 and into the cheeks 46, for holding the end cap 50 in position. The wall portion 51 and holding bar 52 are angularly disposed in accordance with the angular disposition of the recess 45 and with that recess provide a socket for the reception of the cutter blades, designated as 53, with following individual identifying letters a to k inclusive.

As heretofore indicated, a plurality of cutter blades 53 are employed, and these blades are preferably made of flat strip material with a cutting edge 55 along one of the side margins thereof and with the ends 56 beveled to provide a positioning surface for engagement with the wall portion 51 and holding bar 52. It will be noted that with the structure just described, selected cutter blades 53 may have their outer terminal ends projecting beyond the face 42 a predetermined distance. The cutter blades 53 on the edges opposite the cutting edges 55 are preferably provided with arcuate grooves or cut-outs 53x for positioning the blades as hereinafter explained.

The cutter blades 53 are spaced by spacer blocks designated as 57, with individual identifying letters from a to k inclusive. The blocks 57 have lugs 59 extending therefrom which extend into the holding bar 52 for positioning and preventing displacement thereof. A tightening set screw 62 is provided, extending through one of the cheeks 46 and into engagement with the end spacer block 57k.

The spacer blocks 57 may be of any desired thickness in accordance with the desired spacing of the cutter blades 53. For cutter blades of a thickness of the order of .013 inch, the spacer blocks 57 may be of thicknesses as hereinafter set forth, these dimensions being given merely by way of illustration of a practical embodiment of the invention and one useful for a wide range of tire sizes. As illustrated, the cutter blade 53a is disposed in engagement with a spacer 57' which is in turn in engagement with one of the cheeks 46 and a spacer block 57a, of a thickness of the order of 0.0625 inch, has one side face in engagement with the cutter blade 53a. The cutter blade 53b is in engagement with the other side face of the block 57a. The cutter blade 53c is spaced from the cutter blade 53b, by a spacer block 57b, of the thickness of the order of 0.475 inch, and has the spacer block 57c, of a thickness of the order of 0.0625 inch, in engagement therewith. The cutter blade 53d is in engagement with the spacer block 57c and is spaced from the cutter blade 53e, by the spacer block 57d, of a thickness of the order of 0.490 inch. The cutter blade 53e, in engagement with the spacer block 57d, is spaced from the cutter blades 53f and 53g by the spacer blocks 57e and 57f, each of a thickness of the order of 0.0625 inch. The cutter blade 53g has one side face of the spacer block 57g, of a thickness of the order of 0.465 inch, in engagement therewith, the other side face of the block 57g being in engagement with the cutter blade 53h. The cutter blades 53i, 53j and 53k are spaced from the cutter blade 53h by spacer blocks 57h, 57i and 57j each of a thickness of the order of 0.093 inch, and the cutter blade 53j has the end block 57k in engagement therewith. The end block 57k may be of a thickness of the order of 0.312 inch. The center of the spacer block 57d is preferably alined with the central axis of the guide bar 43.

The grooves or cut outs 53x permit of the insertion of a screw driver or like tool for sliding the blades 53 into cutting position with their beveled ends 56 in engagement with the end cap 50 or with their beveled ends 56 withdrawn from such contact and so that their ends 56 do not project beyond the face 42.

For tire sizes in the range from 6.70 to 7.10, the blades 53a, 53g and 53k are moved out of cutting position and for tire sizes in the range from 7.60 to 8.20, the blades 53b and 53h are moved out of cutting position.

As will be seen in Fig. 1, a fragmentary section of the tread portion of a tire is shown at 60, having circumferential grooves 61. The grooves 61 may be straight or zig-zag but have a root width in a substantially straight circumferential direction of the width to receive the guide bar 43 without sidewise motion of the guide bar 43 in the groove being permitted.

With a tire mounted in the frame 11, upon rotation of the tire by the roller 17, the cutter block 35 is supported by the pivot pin 28 and the resiliently held guide blocks 30 and 31 so that it can float in its movement. The mounting of the pivot pin 28 permits a sidewise swinging as well as a parallel movement of the cutter block 35 as guided by the engagement of the guide bar 43 in a circumferential tire groove 61.

With the guide bar 43 in engagement in the second groove 61 from the outer side wall of the tire casing 60, upon rotation of the tire a plurality of circumferential incisions or slits will be simultaneously cut by the blades 53, in accordance with the positioning of the blades 53 for cutting a tire in a particular size range. The guide bar 43 rides in this groove 61 and positions the cutter block 35 transversely throughout such rotation so that the incisions are made at the desired locations and following the grooves 61 in spaced relation thereto.

When one set of incisions has been made, the tire casing 60 is removed and replaced in the frame 11 in reversed position, and with the guide bar 43 in the second groove from the other outside wall. Upon rotation of the tire as before, a second set of circumferential incisions or slits will be cut simultaneously by the cutters 53.

With the cutter blades 53 mounted and fixedly spaced as heretofore indicated, circumferential incisions can be made on a variety of sizes of tires without repositioning of the cutter blades 53.

It may also be noted that with the arrangement of blades 53 and guide bar 43 shown the pressure for cutting tends to hold the bar 43 in the groove with cutting forces applied on each side thereof. The spring 28a, interposed between the block 31 and the end of the bracket 25, permits limited shifting but prevents undue motion at this location attendant upon shifting of the pivot pin 28 and the block 31 upon accommodating movement of the blade holder as determined by the guide bar 43.

This application is a continuation in part of our prior application filed July 27, 1951, Serial No. 238,926, and now abandoned.

We claim:

1. In apparatus for the circumferential slitting of the peripheral surfaces of a circumferentially grooved tire, a tool mounting head fixedly positioned with respect to the periphery of the tire, a blade holder, members for mounting said holder on said head for sidewise movement, said blade holder having an exterior contact face transversely disposed in spaced relation to said head for contact with the peripheral tire surface, a fixed guide bar projecting outwardly from said face and extending longitudinally therealong for circumferential sliding engagement in a circumferential tire groove, said guide bar being offset to one side of the holder mounting, and a plurality of spaced blades mounted in said blade holder having their cutting edges extending outwardly with respect to said contact face in parallel relation to said guide bar, said blades being disposed on opposite sides of said guide with a preponderant number of blades disposed on one side of said guide bar.

2. In apparatus for the circumferential slitting of the circumferentially grooved peripheral surface of a tire, a tool mounting head fixedly positioned with respect to the periphery of the tire, blade holder means, mounting members for said blade holder means carried by said head for sidewise shifting movement of said blade holder means, said blade holder means having an exterior contact face transversely disposed in spaced relation to said head for sliding contact with the peripheral tire surface, a fixed guide member projecting outwardly from said face and extending longitudinally therealong for engagement in one of the circumferential grooves, and a plurality of cutter blades mounted in said blade holder means with portions extending outwardly with respect to said contact face in parallel relation to said guide bar, a plurality of said blades, including a spaced pair of blades, being disposed on one side of said guide member, and a plurality of said blades, including two spaced groups each of at least three blades, being disposed on the other side of said guide member.

3. In apparatus for the circumferential slitting of the circumferentially grooved peripheral surface of a tire, a tool mounting head fixedly mounted in spaced relation to the periphery of the tire, blade holder means, mounting members for said blade holder means carried by said head for sidewise shifting movement of said blade holder means, said blade holder means having an exterior contact face transversely disposed in spaced relation to said head for contact with the peripheral tire surface, a fixed guide bar longitudinally disposed and projecting outwardly from said face and extending longitudinally therealong for sliding engagement in one of the circumferential grooves, and a plurality of flat parallel cutter blades mounted in said blade holder means in parallel relation to said guide bar with portions extending outwardly with respect to said contact face, a plurality of said blades, including a spaced pair of blades, being disposed on one side of said guide bar, and a plurality of said blades, including two spaced groups each of at least three blades, being disposed on the other side of said guide bar.

4. In apparatus for the circumferential slitting of the circumferentially grooved peripheral surface of a tire, the combination comprising a tool mounting head fixedly positioned with respect to the periphery of the tire, a blade holder having parallel tire tread cutters mounted therein and extending outwardly from one face thereof, a guide member on said blade holder extending outwardly from said face for longitudinal engagement in one of the circumferential tire grooves, the longitudinal axis of said guide member being parallel to said cutters, a pivotal connection between said blade holder and said head and having its pivotal axis longitudinal of said holder and in a plane parallel to said face, and resilient mounting members in said blade holder for end portions of said pivotal connection for permitting relative movement of said blade holder in the plane of said face and as determined by said guide member.

5. In apparatus for the circumferential slitting of the circumferentially grooved peripheral surface of a tire, the combination comprising a tool mounting head fixedly positioned with respect to the periphery of the tire, a blade holder having a tire engaging face portion with parallel tire tread cutters extending outwardly therefrom, a guide member rigidly mounted on said face portion for longitudinal engagement in one of the circumferential tire grooves, the longitudinal axis of said guide members being parallel to said cutters, a pivotal connection between said blade holder and said head including a pivot having its pivotal axis longitudinal of said holder and in a plane parallel to said face portion, journal blocks for said pivot mounted in said blade holder and movable in a plane parallel to said face portion, and resilient members between said blocks and said blade holder for permitting movement of said blade holder in said plane as determined by said guide member.

6. In apparatus for the circumferential slitting of the peripheral surface of a circumferentially grooved tire, a tool mounting head fixedly positioned with respect to the periphery of the tire, a blade holder, said blade holder having an exterior contact portion transversely disposed in spaced relation to said head for sliding contact with the peripheral tire surface, a pivotal connection between said head and said holder, said pivotal connection including a pivot pin having its pivotal axis longitudinal of said blade holder, resilient mounting members for said pin for mounting said holder for movement in a plane parallel to said contact portion, a guide member rigidly secured to and extending outwardly from said contact portion and longitudinal of said blade holder for engagement in a circumferential tire groove, and a plurality of spaced parallel blades mounted in said blade holder in parallel relation to the longitudinal axis of the guide member and having cutting edges disposed parallel and extending outwardly with respect to said contact portion.

7. In apparatus for the circumferential slitting of the peripheral surface of a circumferentially grooved tire, a tool mounting head fixedly positioned with respect to the periphery of the tire, a blade holder, said blade holder having an exterior contact face transversely disposed in spaced relation to said head for contact with the peripheral tire surface, a pivotal connection between said mounting head and said blade holder including a pivot pin having its pivotal axis longitudinal of said blade holder, resilient mounting members for said pin carried by said blade holder for mounting said holder for movement in a plane parallel to said contact portion, a guide member rigidly mounted on and extending outwardly from said face and longitudinal of said holder for engagement in a circumferential tire groove, and a plurality of spaced parallel blades mounted in said blade holder parallel to the longitudinal axis of said guide member, said blades having cutting edges disposed parallel and extending outwardly with respect to said face.

8. In apparatus for the circumferential slitting of the peripheral surface of a circumferentially grooved tire, a tool mounting head fixedly positioned with respect to the periphery of the tire, a blade holder, said blade holder having an exterior contact face transversely disposed in spaced relation to said head for sliding contact with the peripheral tire surface, a pivotal connection between said head and said blade holder including a pivot pin having its pivotal axis longitudinal of said blade holder, resilient mounting members for said pin carried by said blade holder for mounting said holder for movement in a plane parallel to said contact portion, a guide bar rigidly mounted on and projecting outwardly from said face and longitudinal of said holder for sliding engagement in a circumferential tire groove, and a plurality of spaced parallel blades mounted in said blade holder parallel to said guide bar, said blades having cutting edges disposed parallel and extending outwardly with respect to said face, said blades being disposed on opposite sides of said guide bar.

9. In apparatus for the circumferential slitting of the peripheral surface of a circumferentially grooved tire, a tool mounting head fixedly positioned with respect to the periphery of the tire, a blade holder, said blade holder having an exterior contact face transversely disposed in spaced relation to said head for contact with the peripheral tire surface, a pivotal connection between said head and said blade holder including a pivot pin having its pivotal axis longitudinal of said blade holder, resilient mounting members for said pin carried by said blade holder for mounting said holder for movement in a plane parallel to said contact portion, a guide member rigidly mounted on and extending outwardly from said face and longitudinal of said holder for engagement in a circumferential tire groove, and a plurality of spaced parallel blades mounted in said blade holder parallel to the longitudinal axis of said guide member, said blades having their cutting edges extending outwardly with respect to said contact face for simultaneous cutting engagement with a transversely arcuate portion of said peripheral surface, said blades being disposed on opposite sides of said guide member with a preponderant number of blades on one side of said guide member.

References Cited in the file of this patent
UNITED STATES PATENTS

| | | |
|---|---|---|
| 535,191 | Bretherton | Mar. 5, 1895 |
| 1,366,784 | Gardner et al. | Jan. 25, 1921 |
| 1,812,901 | Rohner | July 7, 1931 |
| 1,916,258 | Errig et al. | July 4, 1933 |
| 1,934,181 | Fouke | Nov. 7, 1933 |
| 2,310,153 | Rosenfarb | Feb. 2, 1943 |
| 2,360,363 | Pope | Oct. 17, 1944 |
| 2,578,997 | Errig et al. | Dec. 18, 1951 |
| 2,638,984 | Errig et al. | May 19, 1953 |